(No Model.)

M. O. REEVES.
MEANS FOR SECURING PULLEYS TO SHAFTS.

No. 419,556. Patented Jan. 14, 1890.

Witnesses
V. M. Hood.
A. M. Hood.

Inventor
Milton O. Reeves.
By H. P. Hood.
Attorney

UNITED STATES PATENT OFFICE.

MILTON O. REEVES, OF COLUMBUS, INDIANIA, ASSIGNOR TO THE REEVES PULLEY COMPANY, OF SAME PLACE.

MEANS FOR SECURING PULLEYS TO SHAFTS.

SPECIFICATION forming part of Letters Patent No. 419,556, dated January 14, 1890.

Application filed February 25, 1889. Serial No. 301,061. (No model.)

*To all whom it may concern:*

Be it known that I, MILTON O. REEVES, a citizen of the United States, residing at Columbus, in the county of Bartholomew and State of Indiana, have invented a new and useful Improvement in Means for Securing Pulleys to Shafts, of which the following is a specification.

My invention relates to an improvement in means for securing to a shaft a pulley, particularly a split pulley, of that class in which the pulley-hub is bored out larger than the shaft and a wooden bushing is inserted between the shaft and the pulley.

The object of my improvement is to prevent the bushing and pulley from turning on the shaft by means which may be readily applied when a pulley must be secured on the shaft after the shaft has been mounted in its hangers, as when additional pulleys are required.

The accompanying drawings illustrate my invention.

Figure 1:
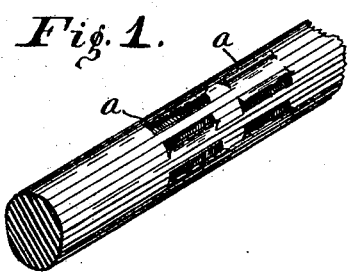
Figure 2:
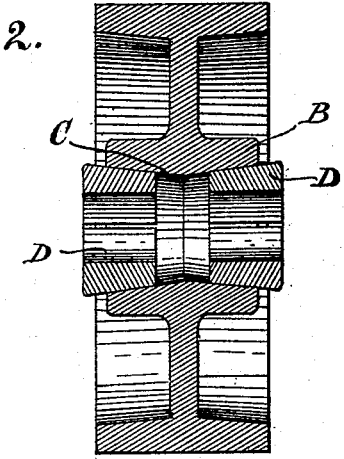
Figure 4:
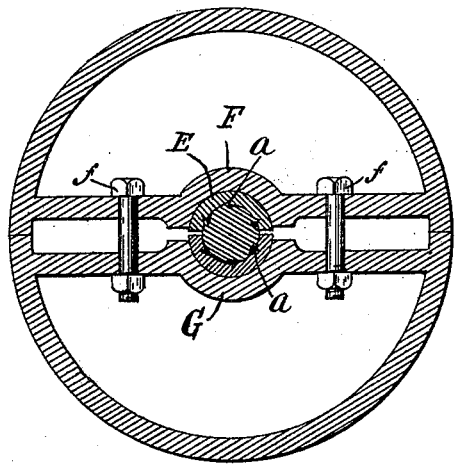
Figure 3:
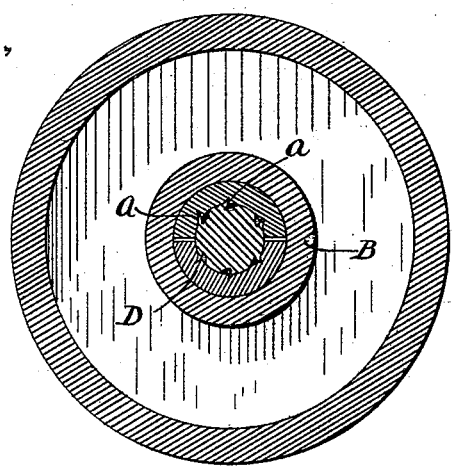

Figure 1 represents a view in perspective, showing a portion of a shaft prepared to receive a pulley. Fig. 2 represents a longitudinal section of a pulley having a tapered central opening and a correspondingly-tapered split bushing. Fig. 3 represents a transverse section of the same pulley mounted on a shaft having my improvement. Fig. 4 represents a transverse section of a split pulley having its two segments clamped together over a straight split bushing.

Heretofore the wooden bushings in this class of pulleys have been clamped upon the smooth surface of the shaft, dependence being placed entirely on the frictional adhesion of the bushing to the shaft.

My improvement consists in raising one or more sharp-edged ratchet-shaped teeth, like $a\ a$, out of the periphery of the shaft by means of a cold-chisel or like tool. These teeth $a$ may be all turned in one direction, having their retaining-faces opposed to the direction in which the shaft is to be run if the shaft is to be driven by the pulley, or they may be arranged reversely if the shaft is to be the driver, or some of the teeth may face one direction and some the opposite direction, as shown.

In Figs. 2 and 3, B is the hub of the pulley having a central opening C of a larger diameter than the shaft and tapering outward at each end.

D D are split bushings tapered exteriorly to fit the pulley and bored out centrally to fit the shaft.

In operation, the pulley after being put on the shaft is placed over that portion of the shaft on which the teeth $a$ have been raised, and the tapered split bushings D are then inserted and driven into the tapered opening C, thus forcing the half-sections of the bushings down on teeth $a$ and embedding the teeth in the bushing and clamping the bushing upon the shaft and securing the pulley. In the case of the split pulley shown in Fig. 4 the split bushing E is first placed on the shaft over the teeth $a$, and the two segments F and G are then brought together over the bushing and clamped together by the bolts $f$, thus embedding the teeth in the bushing.

I am aware that it is not new to insert a tooth or "feather" in a shaft for the purpose of preventing a pulley from turning thereon; but my device differs from that in that it can readily be formed in a shaft when in its hangers, is, owing to its shape, more easily embedded in the bushing, and may, in case the pulley is removed, be hammered back into its original position in the shaft, thus forming again a smooth surface on the shaft.

I claim as my invention—

The combination, with a pulley having a central axial opening and a split wooden bushing therefor, of a shaft adapted to fit the interior surface of the bushing and having a series of sharp-edged ratchet-shaped teeth raised out of the substance of the shaft and projecting beyond its periphery, whereby the bushing is prevented from turning upon the shaft, as set forth.

MILTON O. REEVES.

Witnesses:
MARSHALL HACKER,
GEO. W. CALDWELL.